June 10, 1952     M. ENGLER     2,600,291
ROTATABLE DRUM PRESSING AND PLY TURNING DEVICE
Filed Dec. 21, 1949     3 Sheets-Sheet 1

INVENTOR
Max Engler
BY Evans + McCoy
ATTORNEYS

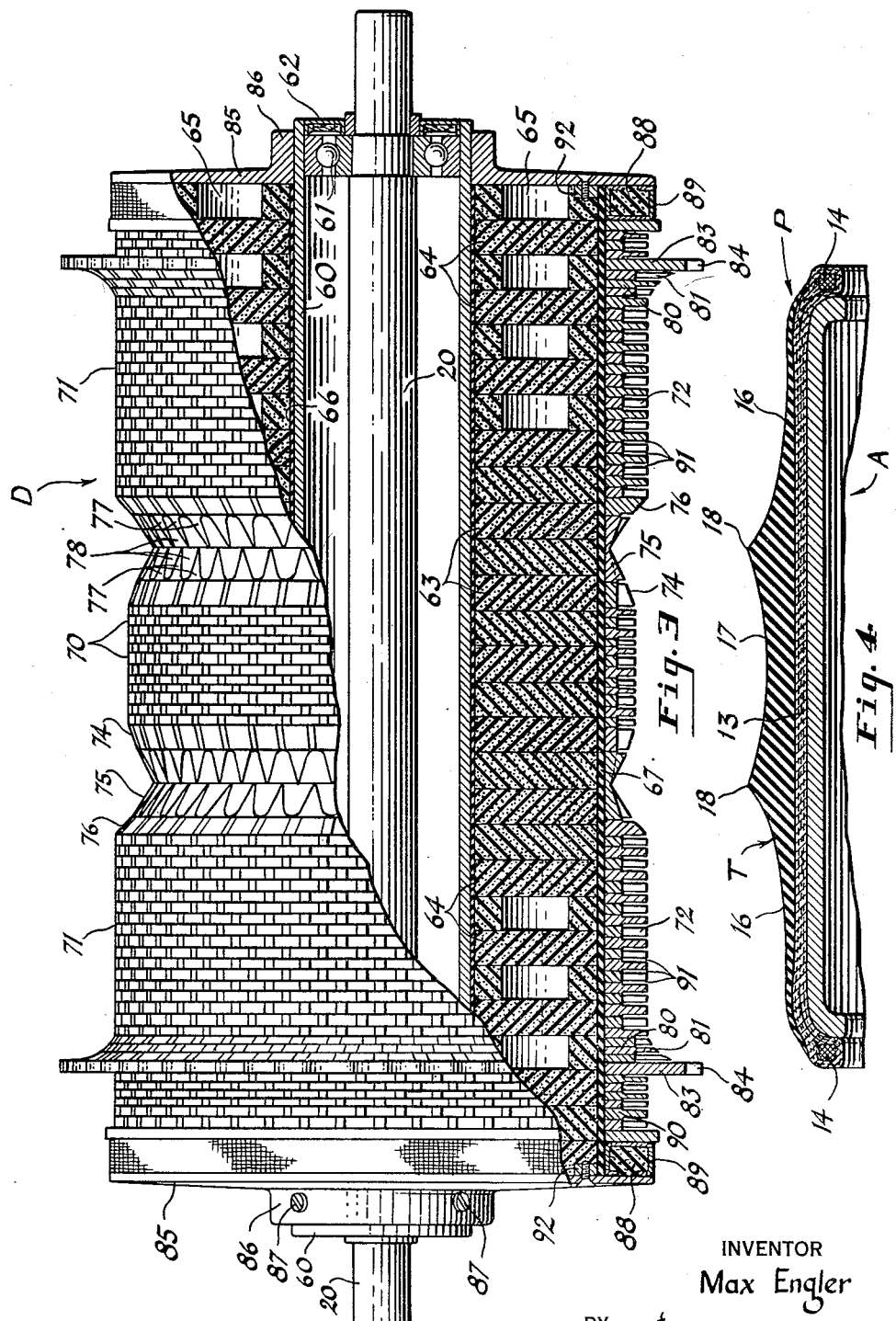

June 10, 1952   M. ENGLER   2,600,291
ROTATABLE DRUM PRESSING AND PLY TURNING DEVICE
Filed Dec. 21, 1949   3 Sheets-Sheet 3
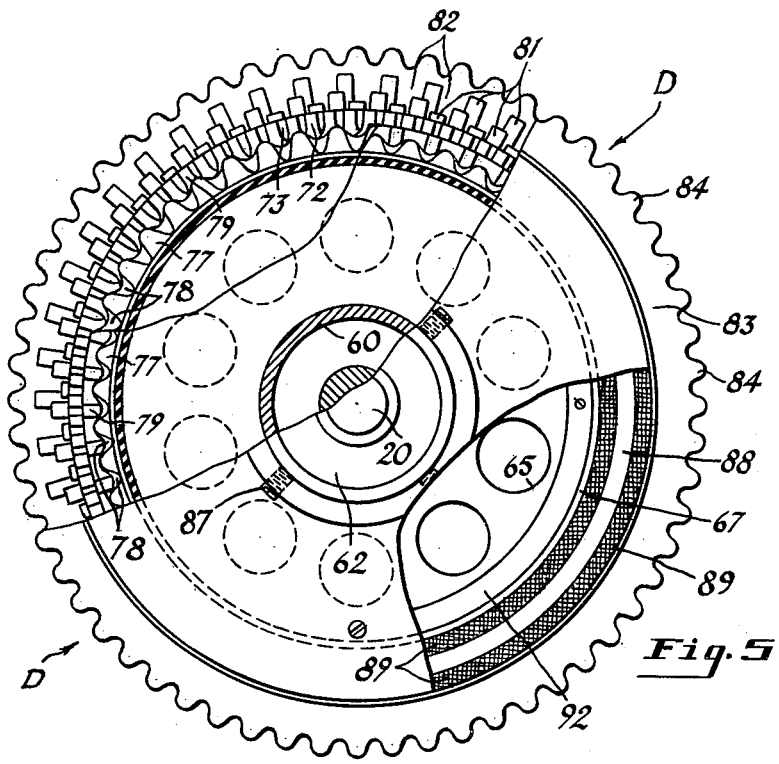
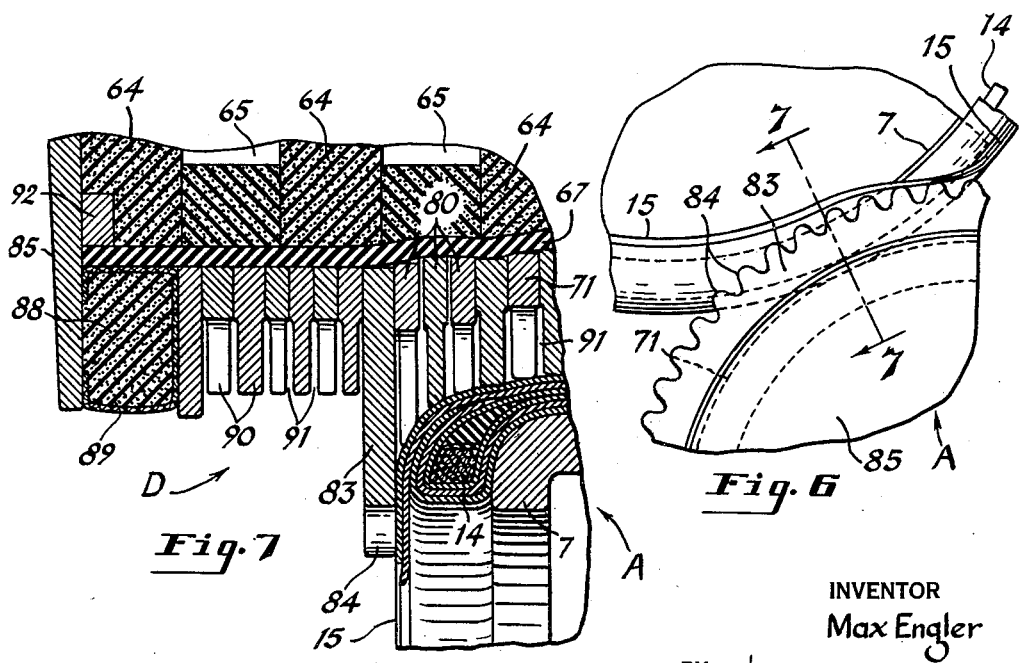
INVENTOR
Max Engler
BY Evans + McCoy
ATTORNEYS Patented June 10, 1952

2,600,291

UNITED STATES PATENT OFFICE 2,600,291

ROTATABLE DRUM PRESSING AND PLY TURNING DEVICE

Max Engler, Akron, Ohio, assignor to The General Tire and Rubber Company, Akron, Ohio, a corporation of Ohio Application December 21, 1949, Serial No. 134,230

21 Claims. (Cl. 154—9)

This invention relates to apparatus used in the building of pneumatic vehicle tires and more particularly to an improved ply and tread stock compacting or stitching roller for use against the building drum of apparatus employed in the flat band tire making process. In making tires by the so-called flat band process, layers of ply material are superimposed upon one another about a substantially cylindrical drum, wire hoops or bead anchorages are wrapped or enveloped in the marginal portions of the ply material at the ends or shoulders of the drum, and a transversely contoured strip of rubber stock is placed about the drum to form a tread and sidewall annulus embracing the ply material layers. The present invention is principally concerned with the placing and compacting or stitching together of the ply material layers and the strip or annulus of tread and sidewall rubber stock. It is also concerned with the radial inward folding or turning of annular portions of the ply material layers which project axially beyond the drum ends to position such inturned ply material portions against the drum shoulders or against underlying ply material.

One of the principal objectives of the invention is to provide, for use in combination with a tire building drum, a generally improved pressure roller of the type in which a plurality of circular elements or rings are disposed embracingly about a relatively soft deformable core for individual yielding movement radially when the roller is pressed against the drum periphery. As a preferred arrangement, the yielding core of the roller is made of sponge rubber surrounded by a protective solid rubber sleeve or sheath. The rings are formed with toothed outer peripheries spaced axially from one another.

Another object is to provide a pressure roller of the character mentioned which includes means for turning marginal portions of ply material bands on the building drum radially inwardly while pressing or stitching together superimposed layers of the ply material on the drum. In this aspect of the invention a ring or rings at each end of the roller, and of larger diameter than the central portion of the roller, are disposed so that their peripheries simultaneously move radially over the drum shoulders as the roller is brought into bearing engagement with the drum circumference.

A further object of the invention is to provide an improved mounting means for a tire building pressure roller, the mounting means being arranged to move the roller laterally toward and away from the building drum and including means biasing the roller normally to bear against the drum with relatively light pressure in combination with means operative to urge the roller to bear against the drum with relatively heavy pressure or to withdraw from the drum. Preferably, the drum mounting means takes the form of a tiltable carriage or cradle counter-weighted to use gravity as the biasing force and having connection with power actuated means for either tilting the carriage in holding the roller against the tire building drum with relatively heavy pressure or in moving the carriage away from the drum.

Other objects and advantages relating to certain combinations of parts and features of construction are apparent in the following description made in connection with the accompanying drawings, forming a part of this specification. Like parts throughout the several figures are indicated by the same letters and numerals of reference.

In the drawings:

Fig. 3 is a front elevational view, partly in section and with parts broken away and removed, showing the pressure roller and its shaft removed from its supporting carriage, this view being enlarged with respect to the preceding figures;

Fig. 4 is a fragmentary radial section, partly diagrammatic, taken longitudinally through the building drum and a completed tire band thereon, to show the tire band profile in relation to the pressure roller profile, this view being drawn to the same scale as the roller in Fig. 3;

Fig. 5 is an end view of the pressure roller, partly in section and with parts broken away and removed, this view being drawn to the same scale as Fig. 3;

Figure 1:
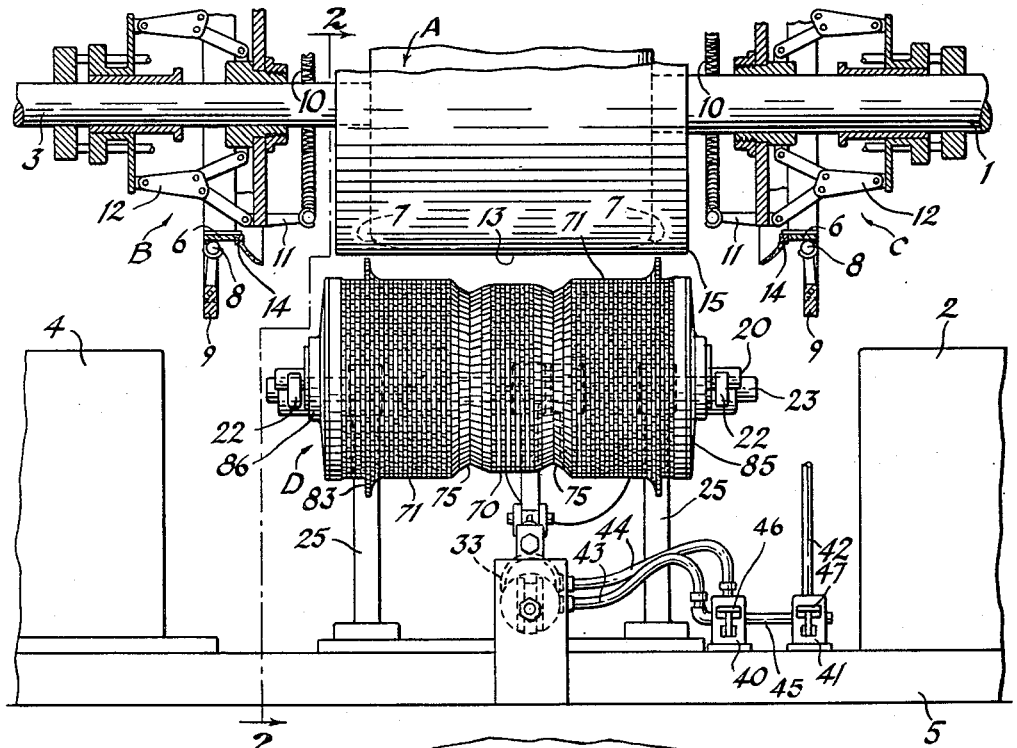
Figure 1 is a front elevational view, partly diagrammatic and with parts broken away and removed, of a portion of a tire building apparatus which includes the pressure and ply turning roller of the present invention.

Fig. 6 is a fragmentary elevational detail, partly diagrammatic, of the tire building drum and the pressure and ply turning roller, showing the action of the latter in folding ply material inwardly over one of the drum shoulders; and Fig. 7 is a fragmentary sectional detail, partly diagrammatic, taken radially through one corner or shoulder of the tire building drum and the pressure roller, as along the line 7—7 of Fig. 6, showing the ply material folding and the pressing action, this view being enlarged with respect to Fig. 6.

The ply compacting and turning and tread stock stitching pressure roller of the present invention, indicated at D, can be used to advantage in various types of tire building machines including manual, semi-automatic, and automatic. It is of particular utility in machines of the type shown in United States Patent 2,455,038 issued November 30, 1948, on Apparatus For Building Tires. The present stitching or pressing roller obviates certain of the ply turn down steps previously performed by devices such as the garter spring or folding annuluses and may be used in lieu of the end rollers 121 and the center roller 122 shown in that patent.

For the reason that the ply turning and pressure roller of the present invention can be used in combination with various tire builders, only such parts of the tire builder are illustrated as are necessary or convenient to an understanding of the operation of the roller. The tire builder is constructed in its essentials as illustrated and described in the patent referred to and comprises a collapsible and rotatable building drum A of conventional construction, a stationary bead building head C and a movable bead building head B. The drum A is carried by a horizontal shaft 1 which is journaled in a supporting structure that includes a pedestal 2. The bead building head C is also supported on the shaft 1 and the bead building head B is supported on a horizontal shaft 3 aligned with the shaft 1 and mounted on a support structure that includes a movable pedestal 4. A base 5 underlies the pedestals 2 and 4, the latter being slidable along the base to withdraw the bead building head B from the left end of the drum A so that a completed tire band P may be withdrawn from the drum when the latter is collapsed.

The bead building heads B and C are essentially the same and include cylindrical bead placing rings 6 movable axially toward and away from curved or rounded shoulders 7 on the opposite ends of the drum A. Elastic annuluses 8 which may take the form of helical coil springs are carried by rings 9 for axial movement over the drum ends. These coil springs press and compact the fabric flippers of bead assemblies 14 previously placed by the rings 6 against inturned ply material at the shoulders of the drum A. Initial turning in of the margins of the first pair or group of ply material layers and the folding out of the ply material margins about the beads is effected by suitable means not all shown but which may include expansible and contractible annuluses 10 carried by arms 11 operated by linkage mechanism 12. The roller of the present invention may also be used for the inturning process, being particularly suited to the inturning of the margins of the second pair or group of ply material layers.

Figure 2:
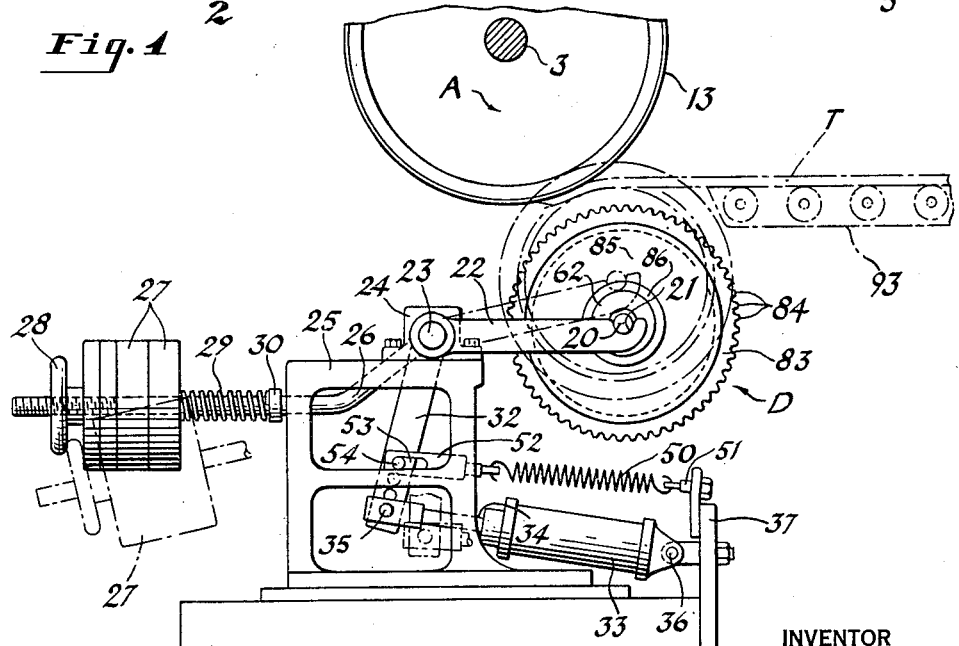
Fig. 2 is a vertical sectional view, partly diagrammatic and with parts broken away and removed, of the tire building apparatus of Figure 1 taken substantially along the line indicated at 2—2 of that figure, this view principally showing an end elevational view of the roller and its mounting means.

In building a tire by the flat band process on machines of the character referred to, ply material in the form of bias cut cord fabric strips is wrapped about the drum A in a plurality of layers to form a first band, the margins of which are turned over the drum shoulder. After the placing of the beads and the folding of the first ply band margins about the beads a second ply band is formed on the drum similarly to the first. The margins of this second band are then folded about the beads. In Figs. 1 and 2 an endless ply band is indicated diagrammatically at 13. The ply material employed is conventional weftless or weak weft rubber impregnated cord sheet, the individual cords being diagonally disposed across the cylindrical face of the drum and the cords of successive ply layers being disposed in alternate directions.

In the course of the building process, marginal edge portions 15 of the ply material extend axially beyond the drum shoulders 7 as shown in Fig. 1. After the margins of the first ply band are turned radially inward against the drum shoulders, the inextensible bead anchorages or rings 14 are moved or placed thereagainst, as by means of the setting rings 6, the fabric flippers or circular flanges of the bead rings are placed and adhered against the material of the ply band, as by the elastic annuluses 8, and the ply material is then folded outwardly about the bead anchorages to envelope the latter. Additional layers of ply material may be subsequently assembled about the first group of ply layers and the marginal edges folded about and under the bead anchorages.

After the cord material ply layers have been assembled about the drum, a strip of partially cured or uncured rubber stock T is wrapped about the ply material layers, the ends of this stock strip being beveled or skived and joined together. The strip T contains or supplies the rubber for the protective coating on the road engaging tread portion, the shoulders and the side walls of the tire. This tread stock is of irregular thickness across its width, its profile being contoured, as shown in Fig. 4, providing relatively thin marginal portions 16 that form the side wall coverings of the tire, a relatively thick portion 17 that forms the road engaging tread of the tire, and upstanding crests 18 intermediate the central portions 17 and the margins 16 that form the shoulders of the tire. As will later appear, the pressure roller D is arranged to engage the tread stock strip T substantially simultaneously across its entire width to effect compacting of the strip against the ply band substantially simultaneously and substantially uniformly across the entire width of the rubber strip T during the stitching or rolling operation. To this end the roller D is formed with an outer surface contoured along its length to provide a profile substantially corresponding in shape to the cross sectional profile of the tread stock strip T.

The roller D is supported on a shaft 20 having reduced diameter ends cradled in depressions or recesses 21 formed in the ends of arms 22 secured in spaced parallel relation in laterally projecting relation on the ends of a horizontal tilt shaft 23. This shaft is supported for turning movement in journal blocks 24 which surmount spaced cast metal frames 25 on the machine base 5. On a central portion of the tilt shaft 23 is secured an arm 26 extending laterally and in a direction opposite to the roll supporting arms 22. A horizontally extending portion of the arm 26 receives a number of weights 27 that counter-balance the weight of the roller D and act by gravity normally to raise the roller against the underside of the drum A so as to apply relatively light pressure against the latter. The force with which the roller D thus bears against the drum is regulated 60 and carries annular metal stitching rings. The sponge core is conveniently made up of a multiplicity of circular sponge discs 63 and 64. These discs are cut or stamped to a uniform diameter from sponge sheets and assembled in side by side relation along the length of the tube 60, the discs being centrally apertured to accommodate the core tube. The sponge discs 63, comprising the central portion of the roller core, are relatively stiffer or more resistant to radial compression than the discs 64 comprising the ends of the core. This effect is produced by making the central discs 63 of sponge rubber having a denser structure than that used for the discs 64 or, if the same type of sponge rubber is used for all discs, by forming a series of circumferentially spaced apertures 65 in each of the discs 64.

Each of the discs is cemented to the core tube 60 to prevent relative turning of the discs thereon. An effective bond between the tube and the discs is provided by vulcanizing a rubber layer or coating 66 on the outer surface of the tube, applying a self-curing cement to such a coating, and immediately thereafter assembling the discs 63 and 64 into their abutting side by side positions.

A flexible rubber tube or sheath 67 of synthetic oil and grease resistant composition is drawn over the core discs 63 and 64 and is bonded to the peripheries of the latter by a suitable self-curing cement first applied to the discs, the inside of the tube, or to both the discs and the tube. As a preferential arrangement the outer surface of the solid rubber tube 67 is hardened or glazed as by chlorination or other treatment to increase its abrasion resistance since the pressure or stitching rings rotate about the yieldable core during operation against the building drum.

Distributed along the length of the yieldable cylindrical core are stitching rings of different diameters, different widths, and different edge contours, these rings may be conveniently formed as by casting or machining from solid blocks of aluminum and its alloys. Other metals may, of course, be employed, but the ease with which aluminum alloys are machined make such materials particularly suitable. The profile of the stitching roller of the present invention is made to conform, in general, to the contour or profile of the particular tread stock strip T being used in the tire building process (see Figs. 3 and 4). Such stock may vary in accordance with the specifications governing the particular tire being made and the easily machined aluminum permits the pressure roller to be readily modified accordingly.

A series or group of rings 70 are disposed in side by side relation in the center of the roller to engage the central tread stock portion 17 of the strip T. Other groups of rings 71, one on each side of the center rings 70, are disposed to contact the side wall portions 16 of the strip rubber T during the stitching of the latter. The rings 71 also serve to stitch the ply materials or layers together while they are being placed on the drum prior to the assembling of the strip T about the latter. Each of the rings 70 and 71 is relatively thin, being of greater radial thickness than axial width. The inner peripheral edges or faces of the rings closely embrace the rubber sleeve 67, the openings in the rings preferably being slightly smaller or less in diameter than the diameter of the yieldable core so that the latter is snugly embraced and slightly compressed by the rings and rotation of the rings on the core is frictionally resisted. The outer edges of the rings are notched or serrated, as shown in Fig. 5, providing a number of circumferentially spaced prongs 72 separated by uniform spaces 73. These spaces are of greater circumferential extent than the prongs or teeth 72, providing for localized contacting of the ply material or rubber stock on the tire building drum during the compacting and stitching operation. The prongs may be of different lengths about the circumference of a ring, but preferably are uniform in radial extent, as shown in Fig. 5.

Intermediate the group of center rings 70 and each of the side groups 71 are groups of shoulder stitching rings 74, 75 and 76. These rings are each wider than any of the rings 70 and 71 and the middle rings 75 have V shaped peripheries. The rings 74 and 76 each have a beveled periphery substantially conforming in slope to and substantially flush with one of the faces of the V ring 75. Each of the ring groups 74, 75 and 76 is disposed to engage one of the crested shoulder portions 18 of the rubber strip T during the stitching operation. The V grooves in the rings 75 receive the crests of the rubber strip shoulder portions 18 and resist separation of the rings from one another so that axial shifting of the rings on the yieldable core is avoided. Notches or recesses 78 at uniform circumferentially spaced intervals about the peripheries of the shoulder stitching rings 74, 75 and 76 provide spaced peripheral lugs or teeth 77.

Adjacent each end of the pressure roller and against the ends of the ring groups 71 is a shoulder engaging ring or rings 80 having their peripheries beveled or otherwise contoured in conformity with the curvature of the shoulders 7 of the building drum A. The peripheries of these rings at each end or shoulder collectively provide a circumferentially continuous concave stitching surface which extends as a continuation of the cylindrical stitching surface provided by the adjacent rings 71. These concave surfaces act over the drum shoulders as shown in Fig. 7. Serrated peripheral edges on the rings 80 provide radial prongs or teeth 81 separated by spaces or notches 82.

Against the outermost rings of the concave peripheral ring groups are disposed ply folding or turning rings 83 of greater diameter than the other rings of the stitching roller. As the roller is moved toward and against the drum A, ply material 15 projecting over and beyond the drum shoulders, as shown in Fig. 1, is initially engaged by the serrated edges of the folding rings 83 and turned or folded radially inward, as shown in Figs. 6 and 7, against the bead anchorages positioned at the drum shoulders. Teeth or lugs 84 on the outer periphery of each of the folding rings 83 are uniformly spaced about the circumferences of the latter and are formed with rounded ends to prevent tearing or damaging the ply material during the folding operation. As the folding is completed, the two groups of concave end rings 80 engage the ply material over the beads at the drum shoulders 7 to compact the plies together.

The several types of rings described above are assembled in side by side relation along the length of the yieldable sponge rubber core and are held in place by circular end discs 85 having hubs 86 received snugly about the core tube 60 and secured to the latter as by set screws 87. Sponge rubber rings 88, provided with canvas or fabric covers 89, are bonded to the inside faces by adding or removing one or more of the weights 27 or by shifting the weights horizontally along the lever or rod 26 to change the moment arm of the weights about the axis of the tilt shaft 23. The outer end of the horizontal portion of the tilt rod 26 is threaded to receive a hand wheel 28 that bears against one end of the weights 27, the hand wheel acting in opposition to a helical coil compression spring 29 received over the arm 26 and interposed between the other end of the weights and a collar 30.

Also secured on the tilt shaft 23 intermediate the journal blocks 24 is a depending actuating arm 32, the lower end of which is connected to a fluid actuated power device. This device comprises a cylinder 33 containing a double-acting piston connected by rod 34 to a pin 35 in the arm 32. The remote end of the cylinder 33 is supported swingably on pin 36 carried by a fixed upright 37 of the machine base 5. By introduction of an actuating fluid such as high pressure air into the left hand end of the cylinder 33, as viewed in Fig. 2, the piston therein draws the rod 34 into the cylinder, causing the cradle structure to be urged in the direction of counterclockwise tilting about the axis of the shaft 23 and thereby augmenting the gravity force of the weights 27 in raising the roller D to press against the drum A. Introduction of high pressure actuating fluid into the right hand end of the cylinder 33 causes the piston to force the rod 34 to the left, tilting the cradle in a clockwise direction about the shaft 23 and thereby withdrawing the roller D from the drum A and overcoming the gravity force of the weights 27.

The operating of the power cylinder assembly is controlled automatically through valves governed by the timing mechanism of the tire building machine or, if desired, it may be controlled by conventional spring biased foot valves 40 and 41 mounted on the machine base 5 and actuated at the will of the operator by treadles 46 and 47, respectively. For simplicity the operation of the pressure roller is described in connection with the foot operated valves, it being understood, of course, that in practice it is preferable to control the valves through the automatic timing mechanism by known means. The valves are connected in series and receive air under pressure from a suitable source (not shown) through a supply conduit 42.

The valve 40 is a four-way valve, receiving high pressure air through conduit 45 connected through valve 41 to the high pressure air supply conduit 42. Outlets of the valve 40 are connected through flexible conduits 43 and 44 to the right and left hand ends, respectively, of the cylinder 33, as viewed in Fig. 2. The spring bias of the valve 40 normally holds it in such position that the high pressure air from the conduit 45 and the valve 41 is connected to flow into the right hand end of the cylinder 33 through the conduit 43 to thereby expel the piston rod 34 and hold the pressure roller D in retracted position—illustrated by the full lines of Fig. 2—the other end of the cylinder being connected to exhaust to atmosphere. When the treadle 46 of the valve 40 is depressed the connections to the cylinder 33 are reversed so that high pressure air is admitted to the left hand end of the cylinder to draw in the piston rod and raise the pressure roller D against the drum, as indicated by the broken lines of the same figure, and the right hand end of the cylinder exhausts to atmosphere.

The valve 41 is a three-way valve spring biased normally to provide a through passage for the high pressure air from the supply conduit 42 to the conduit 45 and the valve 40. When the treadle 47 is depressed the valve shuts off the air supply and permits the cylinder 33 to exhaust to atmosphere so that the cradle swings by gravity action of the weights 27 to the position illustrated by the broken lines of Fig. 2 in which the roller D is disposed against the drum A and bears against the latter with relatively light pressure.

It is desirable in some installations of the pressure roller of the present invention, although not essential to its operation or function, to augment the gravity force of the weights 27 and to cushion or retard the retraction of the roller when the latter is withdrawn from the drum by the action of the power cylinder assembly. A helical coil tension spring 50 may be connected for this purpose between the depending cradle arm 32 and an adjusting screw 51 carried by an extension of the base upright 37. The left end of the spring, Fig. 2, is connected to a lost motion link 52 having a slot 53 that receives a pin 54 in the arms 32. The relatively light force with which the pressure roller D normally is held against the drum A is determined by the weights 27 as augmented (or not) by the adjustment of the tension spring 50. The weights, by reason of their relatively large mass, have a stabilizing effect on the roller cradle to strongly resist rapid oscillating or rocking.

For use in apparatus building tire bands measuring about sixteen to about eighteen inches from bead to bead, so that the roller D has a corresponding effective length, it has been found satisfactory to employ counterweights 27 aggregating about fifty pounds. The resulting pressure of the roller D against the drum can be varied over an appreciable range by adjustment of the hand wheel 28. The pressure of the roller can also be varied, as mentioned above, by increasing or decreasing the number of weights carried by the arm 26. It has been found that adjustment of the hand wheel and weights so that the roller bears against the drum A with a pressure of from about twenty-five to about sixty pounds is satisfactory, the particular adjustment being determined by several factors such as tackiness of stock and length and composition of the tread strip.

Augmentation of the normal light pressure of the roller D against the drum A by introduction of high pressure air or other pneumatic fluid into the cylinder 33 increases such pressure to several hundred pounds, this high pressure compacting and stitching being done with a force of from about two hundred to about five hundred pounds. For example, in a device having a cylinder 33 of about two and one-half inches internal diameter and a piston rod 34 of about one inch diameter, air or pneumatic fluid pressure up to about one hundred pounds per square inch is employed to actuate the piston.

The body of the pressure roller D is carried on a cylindrical metal core tube 60 received telescopically over the shaft 20 and mounted for free rotation on the latter as by ball-bearing assemblies 61. The inner bearing races may be seated against circumferential shoulders formed by reduced diameter portions of the shaft 20 and grease seals 62 are fitted into the ends of the tube 60 against the bearing assemblies. A core of cellular rubber such as blown or whipped sponge rubber or foam latex is disposed about the tube of the rings 85 at the outer periphery thereof to bear against the endmost rings on the roller core. Thus the metal rings are yieldingly held together, slight axial shifting of the rings being permitted all along the length of the roller by reason of the compressability of the cellular rubber end rings 88. Locating rings 92 are formed on or secured to the inside faces of the end discs and are received within the ends of the rubber sheath 60, preferably being cemented thereto. The endmost sponge core discs 64 are suitably relieved or recessed to receive such locating rings.

While the canvas covers of the end cushion rings 88 may be made to bear directly against the folding rings 83, any gap or space therebetween may be taken by filler rings 90 which correspond in general to the rings 71. Since the folding rings 83 are spaced so as to overlie and closely embrace the shoulders 7 of the building drum A, it may be desirable to adjust the spacing of such folding rings along the length of the yielding sponge core of the roller whenever the drum A of the tire builder is changed to build a different type of tire. Adjustment of the folding ring spacing may also be required when the number of plies being built up on a drum is altered. Use of the filler rings 90, which can be added to or removed from the groups of the rings 71, thus facilitates adjustment of the pressure roller to accommodate tire building drums of different sizes and changes in specifications of tires being built. The adjustment is further facilitated by making some of each group of the rings 70, 71 and 90 of one width and other rings in the same group of a different width. For example, some of the rings of each group are made $\frac{1}{4}''$ in thickness while others in the same group are made $\frac{3}{16}''$ in thickness. By suitable interchange and substitution of the rings, it is thus possible to provide axial length adjustment of each of the groups of the rings 70 and 71 and adjustment of the overall distance between the folding end rings 83 to within approximately $\frac{1}{32}''$ of any desired dimension over the useful operating range of the device.

By reason of the different diameters of the several groups of stitching rings, the rings move or rotate circumferentially relative to one another during a pressing operation. This relative circumferential movement of the rings also involves turning or rotating of some or all of the rings on the yielding core, the rings sliding about the surface of the rubber tube 67. A lubricant such as a silicone or other grease is applied to the inner peripheries of the rings and to their contacting faces to reduce friction.

So that grease or lubricant applied to the roller rings does not migrate to the outer peripheries of the rings, means is provided for spacing the outer peripheries of the rings from one another, as shown in Fig. 7. This axial spacing of the ring peripheries, particularly of the lugs or teeth, reduces migration or radial movement of the grease or other lubricant to the outer ends of the ring teeth. The outer peripheries of the rings may be spaced or separated by interposing thin spacer rings of less radial extent than the stitching rings between the latter. It is preferable, however, to provide the desired clearance, indicated at 91, Fig. 7, by making the rings of greater axial width at or adjacent their inner peripheral edges than at their outer peripheral edges. For example, the rings may be cast with relatively thin peripheries providing circumferentially extending reliefs on their side faces. Alternatively, such reliefs may be turned or otherwise formed thereon after the rings have been shaped. The reliefs may be formed on one side only of each ring or preferably, and as shown, on both sides of each ring so that, if desired, the rings may be reversed on the core.

The stitching roller of the present invention, effective as it is across the entire width of the building drum A, is utilized in several of the operations or process steps involved in the building of the pneumatic tire band P. However, in the initial placing or wrapping of the ply material 13 about the drum A to form the first two or three ply band, the pressing roller D is held away from the drum face so that a clearance is provided between the roller and the drum face, as shown in Fig. 1 and by the solid lines of Fig. 2. In this retracted position the peripheries of the ply turning discs or rings 83 are withdrawn outwardly beyond the diameter of the drum so as not to contact or interfere with the projecting marginal edge portions 15 of the ply material during the ply wrapping or placing operation.

After the several layers of ply material comprising the first ply band are wrapped about the drum A, the marginal portions 15 of the ply band are turned radially inward against the drum shoulders, as by means of the folding annuluses 10.

After the inward turning of the margins 15 of the first ply band the circular bead assemblies 14 are placed against the drum shoulders by the seating rings 6 and the bead flippers are pressed and stitched against the first ply band by the extensible annuluses or spring rings 8. During the bead placing operation also the pressing roller D is held in retracted position withdrawn from the drum face. The roller remains in this retracted position during the subsequent folding of the ply band margins 15 outwardly about the bead anchorages and also during the placement of a second group or series of ply material layers in superposed relation about the first ply band on the drum A.

After placement of the second ply band about the drum, the air shut-off treadle 47 is depressed, permitting the weights 27 gravitationally to raise the roller D against the drum to turn in the projecting marginal portions of the second ply band which project beyond the drum shoulders D. This action of the ply folding or turning rings 83 is shown diagrammatically in Fig. 6, it being understood that the operation takes place progressively around the drum circumference with the roller D being pressed toward and against the drum with only the relatively light force of from about ten to about thirty pounds furnished by the action of gravity on the weights 27. At the completion of this ply turning operation the concave contoured shoulder rings 80 press the ply material firmly against the curved or rounded shoulders 7 of the drum, as shown in Fig. 7, the rings 80 being formed with outer peripheries of such diameters as to cause compression of the underlying portions of the sponge core and the rubber sleeve 60 preliminarily to and greater than the concurrent compression of the core and the sleeve by the rings 71.

In this turning in of the marginal portions of the second ply band which, of course, overlies the first ply band on the drum, the shoulder pressing rings 80 and the turning rings 83 may shift axially to accommodate the increased thickness of ply material on the drum. This axial shifting of the rings on the sponge core of the pressing roller is accommodated and taken up by compression of the sponge rubber rings 88 at the drum ends. The in-turning of the margins 15 of the second ply band at the drum shoulders is accomplished by a progressive stitching and compacting of such folded in ply band margins against the underlying ply material of the marginal portions of the first ply band which, at this stage of the process, and as previously explained, are wrapped about the bead anchorages. This stitching of the second ply band margins against the underlying ply material occurs in a progressive manner both circumferentially and radially about the building drum A and may require several revolutions of the drum, the teeth 84 of the ply turning ring 83 moving with a stroking and smoothing action over the drum shoulders to smooth out the ply material being turned and to press it firmly against the underlying ply material. In connection with this operation the diameter or size of the turning rings 83 of the pressing roller is of considerable importance. Although the exact diameter is not critical it is related to the diameter of the building drum A in that the larger the turning rings 83 the better is the control over the ply material and the more perfect is the turning operation. The turning rings 83 can be somewhat less in diameter than the building drum A although it is preferable that they be greater than one-half the diameter of the drum. For drums of from about fifteen to about twenty inches in diameter it has been satisfactory to employ pressing rollers having turning rings 83 of from about ten to about eighteen inches in diameter, preferably about fourteen inches in diameter. The other rings comprising the pressing roller are proportioned accordingly to provide an overlap of the turning rings 83 at the drum ends of from about one to about one and one-half inches. This overlapping of the turning rings at the drum ends covers an appreciable segment across the building drum, as shown in Fig. 6, and provides effective control of the ply material during the turning or folding which results in more effective smoothing and working of the ply material. Thus the desired firmly compacted and wrinkle-free ply structure is produced in the shoulder portions of the tire band P.

After the several ply material bands have been placed about the drum and their marginal end portions folded about the inextensible bead anchorages 14 by the action of the turning rings 83 in cooperation with the conventional turning and folding instrumentalities of the tire builder, the tread rubber stock strip T is placed about the drum A on the outside of the ply material bands. This placing of the irregularly contoured strip T about the drum is facilitated by the pressing roller D which, being relatively lightly pressed against the drum A by the action of the weights 27, presses the tread strip T against the ply material on the drum as the tread strip is advanced in inverted position over a roller conveyor 93 (Fig. 2) into the bight between the drum and the pressing roller. The conveyor 93 is angled into the bight of the drum and roller so that the tread strip T first engages the contoured profile of the roller and is centered thereby to correctly contact the cylindrical surface of the ply material on the drum A. In this connection it is to be noted that the pressing roller D is self-centering with respect to the drum A by reason of the action of the shoulder rings 80 and the ply turning rings 83 riding over the curved shoulders 7 of the drum, the roller being arranged to shift bodily and axially to accommodate any misalignment. The ends of the shaft 20 are free to shift in the arm recesses 21.

Adhesion between the upwardly directed tacky surface of the tread strip T and the rubber cord material comprising the ply bands on the drum A occurs as the leading end of the tread strip T is directed against the drum by the pressing roller D. Continued rotation of the drum, which is power driven at a relatively slow rotational speed during this strip placing operation, draws the tread strip T off the conveyor 93 to wrap such strip around the drum. Since this placing of the tread strip T about the building drum is performed under only relatively light pressure of the roller D, as provided by the weights 27, the operator subsequently can, if desired or necessary, readily withdraw one or both of the end portions of the tread strip T from adhering relation against the ply material on the drum for the purpose of providing the correct overlap of the skived or beveled ends of such tread strip in manually making the customary splice.

As previously mentioned in describing the tilt carriage for supporting the pressure roller D, the normal light pressure of the roller against the drum can be adjusted by shifting the weights 27 along the arm 26, this adjustment being effected by rotation of the hand wheel 28 acting against the coil spring 29. The normal or light pressure of the roller against the drum is adjusted so that it is at least sufficient to cause the tread strip T to adhere to the ply band carried by the drum, the subsequent high pressure stitching or compacting action of the roller being relied upon to firmly bond the tread strip to the ply band. Thus the adjustment of the weights 27 depends upon a number of factors such as the tackiness of the ply material on the drum A, the tackiness of the surface of the tread strip T, and the stiffness of the tread strip. Another factor influencing the adjustment of the weights 27 is the length of the tread strip T. These tread strips customarily are cut within reasonable tolerances to a predetermined length and are supplied in quantity to the operator of the tire building machine. In building tires the operator may find that the skived or beveled ends of the tread strips do not precisely meet, the strips either being somewhat too long or somewhat too short. Should they be too short, the operator adjusts the handle 28 to increase the normal pressure of the roller D against the drum, this increased pressure of the roller tending to stretch or increase the length of the tread strip T while the latter is being applied about the drum. Conversely, if the tread strips are too long, the normal light pressure of the roller D is decreased by turning the hand wheel 28 to shift the weights 27 toward the tilt axis of the shaft 23. In this manner the operator is able to make such adjustment of the weights 27 as may be necessary from time to time to insure proper fitting of the tread stock strips, thereby eliminating the difficult and time consuming job of manually trimming one end of the tread strip after it has been applied about the drum.

After the splicing of the tread strip the drum A is rotated by power and the operator depresses the treadle 46 to admit high pressure fluid into the power cylinder and piston assembly and force the pressing roller D against the drum under relatively high pressure firmly to compact the superposed layers of ply material and the tread stock strip T against the surface of the drum A. In this high pressure stitching or pressing operation the force provided by the piston and cylinder assembly augments the force provided by the gravity action of the weights 27 to press out and eliminate air that might otherwise be trapped between the ply material layers or between the outer ply material layer and the tread stock strip T. A beneficial kneading and working of the rubber of the strip T occurs during this high pressure rolling by reason of the different diameters of the several rings and ring groups comprising the roller D, these different ring diameters causing relative circumferential rolling or shifting of the rings about the yieldable sponge core and the frictional engagement between the tubular rubber sleeve 60 and the individual rings acting to restrain the relative rotational movement of the rings.

The contoured profile of the roller D, such profile corresponding in general to the shape of the tread stock strip T, provides simultaneous contact of the pressing roller against the tire band P on the drum across the entire width of the drum face, this contact occurring along a line in a radial plane through the rotational axis of the drum. This continuous contact of the pressing means in a single line across the entire width of the drum results in improved stitching and compacting of the several ply layers and tread strip constituting the tire band and produces an improved tread band that is substantially wrinkle-free and contains a minimum amount and number, if any, of occluded air and air pockets.

In accordance with the patent statutes the principles of the present invention may be utilized in various ways, numerous modifications and alterations being contemplated, substitution of parts and changes in construction being resorted to as desired, it being understood that the apparatus shown in the drawings and described above and the particular method set forth are given merely for purposes of explanation and illustration without intending to limit the scope of the claims to the specific details disclosed.

What I claim and desire to secure by Letters Patent of the United States is:

1. In a pressure roller for use with a rotatable tire building drum, a relatively soft and deformable core and a multiplicity of substantially circular rings disposed embracingly about the core in side by side relation, some of the rings being formed with reliefs about their outer peripheral portions to provide clearances between the outer portions of adjoining rings.

2. In a pressure roller for use with a rotatable tire building drum, a relatively soft and deformable core and a multiplicity of substantially circular rings disposed embracingly about the core in side by side relation, some of the rings having inner peripheries wider than their outer peripheries whereby the outer peripheries of the rings are spaced from one another.

3. In a pressure roller for use with a rotatable tire building drum, a relatively soft and deformable core and a multiplicity of substantially circular rings disposed embracingly about the core in side by side relation, some of the rings having toothed outer peripheries and relatively wide portions disposed radially inward of the toothed peripheries to space the latter axially along the length of the roller.

4. In a pressure roller for use with a rotatable tire building drum, a relatively soft and deformable core, and a multiplicity of substantially circular rings disposed embracingly about the core in side by side relation, for relative radial shifting by sliding against one another substantially independently of one another in conforming to the profile of stock on the building drum, said rings having side faces in confronting relation to one another, one side face of each ring including an inner portion disposed substantially flatwise against and in contact with a side face of an adjacent ring for sliding engagement therewith during relative rotation of the rings, and an outer portion spaced from said adjacent ring to provide a substantially continuous circumferentially extending clearance between the side faces of the rings whereby to confine applied lubricant to the contacting inner face portions of the rings.

5. In a pressure roller for use with a rotatable tire building drum, a relatively soft and deformable core, and a multiplicity of substantially circular rings disposed embracingly about the core in side by side relation, for relative radial shifting by sliding against one another substantially independently of one another in conforming to the profile of stock on the building drum, said rings having side faces in confronting relation to one another, one side face of each ring including an inner portion disposed substantially flatwise against and in contact with a side face of an adjacent ring for sliding engagement therewith during relative rotation of the rings, and an outer portion disposed in a plane offset axially from the plane of said inner portion and spaced from said adjacent ring to provide a substantially continuous circumferentially extending clearance between the side faces of the rings whereby to confine applied lubricant to the contacting inner face portions of the rings.

6. In a pressure roller for use with a rotatable tire building drum, a relatively soft and deformable core, and a multiplicity of substantially circular rings disposed embracingly about the core in side by side relation, for relative radial shifting by sliding against one another substantially independently of one another in conforming to the profile of stock on the building drum, said rings having side faces in confronting relation to one another one side face of each ring including an inner portion disposed substantially flatwise against and in contact with a side face of an adjacent ring for sliding engagement therewith during relative rotation of the rings, and an outer portion spaced from said adjacent ring to provide a substantially continuous circumferentially extending clearance between the side faces of the rings whereby to confine applied lubricant to the contacting inner face portions of the rings, and the peripheries of some of the rings being formed with a series of radially directed teeth separated by spaces opening to the clearances through the outer portions of the side faces of the rings, said spaces being of substantially no greater radial extent than said outer portions of the side faces so that the inner sliding portions of the side faces are substantially uninterrupted and circumferentially continuous and the outer margins of the sliding portions of adjacent rings make circular contact with one another.

7. In a pressure roller for use with a rotatable tire building drum, a relatively soft and deformable core, a multiplicity of substantially circular rings disposed embracingly about the core in side by side relation for relative radial shifting by sliding on one another in conforming to the profile of stock on the building drum, said rings each having opposite side face portions adjacent their outer peripheries disposed in confronting relation to the side face portions of adjacent rings, and means spacing the confronting side face portions of the rings from one another to provide relatively narrow circumferentially continuous clearance spaces between adjacent rings extending radially from the peripheries of the rings toward the roller axis.

8. In a pressure roller for use with a rotatable tire building drum, a relatively soft and deformable core, a multiplicity of substantially circular rings disposed embracingly about the core in side by side relation for relative radial shifting by sliding on one another in conforming to the profile of stock on the building drum, said rings each having opposite side face portions adjacent their outer peripheries disposed in confronting relation to the side face portions of adjacent rings, means spacing the confronting side face portions of the rings from one another to provide relatively narrow circumferentially continuous clearance spaces between adjacent rings extending radially from the peripheries of the rings toward the roller axis, and resilient means acting against one of the endmost rings to hold the rings yieldingly in bearing relation against one another.

9. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller comprising a substantially cylindrical sponge rubber core, a rubber sleeve surrounding the sponge rubber of the core, and a multiplicity of relatively rigid circular elements disposed in side by side relation embracingly about the core and the sleeve.

10. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller comprising a plurality of sponge rubber discs disposed in side by side relation to form a substantially cylindrical core, and a multiplicity of relatively rigid circular elements disposed in side by side relation embracingly about the core.

11. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller comprising a plurality of sponge rubber discs disposed in side by side relation to form a substantially cylindrical core, a rubber sleeve surrounding the sponge rubber of the core, and a multiplicity of relatively rigid circular elements disposed in side by side relation embracingly about the core.

12. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller comprising a plurality of sponge rubber discs disposed in side by side relation to form a substantially cylindrical core, some of said discs being apertured to increase the relative radial deformability thereof, and a multiplicity of relatively rigid circular elements disposed in side by side relation embracingly about the core.

13. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller comprising a plurality of sponge rubber discs disposed in side by side relation to form a substantially cylindrical core, the discs at each of the ends of the core collectively being of relatively greater deformability than the discs at the central portion of the core, and a multiplicity of relatively rigid circular elements disposed in side by side relation embracingly about the core.

14. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller having a length substantially equivalent to the length of the band building drum and comprising a multiplicity of circular elements disposed in side by side relation, the elements being of different diameters to provide a contoured profile along the length of the roller substantially conforming to the contour of a tire band on the drum.

15. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller having a length substantially equivalent to the length of the band building drum and comprising a multiplicity of circular elements disposed in side by side relation, the elements being of different diameters and substantially symmetrically disposed on opposite sides of the middle of the roller to provide a contoured profile along the length of the roller substantially conforming to the contour of a tire band on the drum.

16. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller having a length substantially equivalent to the length of the band building drum and comprising a multiplicity of circular elements disposed in side by side relation, the elements being of different diameters to provide a contoured profile along the length of the roller substantially conforming to the contour of a tire band on the drum, and some of the elements having toothed peripheries for pressure concentration as the roller is moved against a tire band on the drum.

17. In combination with a rotatable drum about which ply material layers and a contoured strip of tread stock are superimposed to form a band in the flat band process of building pneumatic vehicle tires, a pressure roller and means mounting the same for rotation and for lateral bodily movement toward and away from the drum, the roller having a length substantially equivalent to the length of the band building drum and comprising a multiplicity of circular elements disposed in side by side relation, the elements being of different diameters and substantially symmetrically disposed on opposite sides of the middle of the roller to provide a contoured profile along the length of the roller substantially conforming to the contour of a tire band on the drum, and some of the element having toothed peripheries for pressure concentration as the roller is moved against a tire band on the drum.

18. In combination with a rotatable tire building drum having bead positioning shoulders, a tread engaging pressure roller mounted for rotation and for movement toward and away from the periphery of the drum and including portions engageable with stock on the drum simultaneously across substantially the entire width thereof, and the roller also including end elements of greater diameter than the stock engaging portions of the roller, such end elements being positioned outwardly beyond the planes of the drum shoulders and movable radially across the drum shoulders as the roller moves toward the drum to turn stock projecting from the drum ends radially inward over the drum shoulders while stock on the drum periphery is pressed against the drum by the stock engaging portions of the roller.

19. In combination with a rotatable tire building drum having bead positioning shoulders, a tread engaging pressure roller mounted for rotation and for movement toward and away from the periphery of the drum and including portions engageable with stock on the drum simultaneously across substantially the entire width thereof, the roller also including end elements of greater diameter than the stock engaging portions of the roller, such end elements being positioned outwardly beyond the planes of the drum shoulders and movable radially across the drum shoulders as the roller moves toward the drum to turn stock projecting from the drum ends radially inward over the drum shoulders while stock on the drum periphery is pressed against the drum by the stock engaging portions of the roller, and means mounting the end elements for resilient yielding movement away from one another to accommodate variations in thickness of stock being turned.

20. In combination with a rotatable tire building drum of the type employed in the flat band process, a pressure roller extending substantially the full length of the drum and means mounting the roller for rotation and for lateral bodily movement toward and away from the drum, the mounting means comprising a supporting structure, a cradle tiltably supported on the structure for turning movement about a substantially horizontal axis, shaft means supporting the roller on the cradle, a counterweight on the cradle acting by gravity to tilt the cradle and move the roller toward and against the tire building drum, and power actuated means operable alternatively to augment the counterweight in moving the roller against the drum or to overcome the gravity action of the counterweight and withdraw the roller from the drum.

21. In combination with a rotatable tire building drum of the type employed in the flat band process, a pressure roller extending substantially the full length of the drum and means mounting the roller for rotation and for lateral bodily movement toward and away from the drum, the mounting means comprising a supporting structure, a cradle tiltably supported on the structure for turning movement about a substantially horizontal axis, shaft means supporting the roller on the cradle, a counterweight on the cradle acting by gravity to tilt the cradle and move the roller toward and against the tire building drum, and a fluid actuatable piston and cylinder assembly connected between the cradle and the supporting structure, said assembly being operable alternatively to augment the counterweight in moving the roller against the drum or to overcome the gravity action of the counterweight and withdraw the roller from the drum.

MAX ENGLER.

REFERENCES CITED

The following references are of record in the file of this patent:

UNITED STATES PATENTS

| Number | Name | Date |
| --- | --- | --- |
| 1,855,229 | Flener | Apr. 26, 1932 |
| 1,970,780 | Stevens | Aug. 21, 1934 |
| 2,040,466 | Christy | May 12, 1936 |
| 2,406,093 | Miller | Aug. 20, 1946 |
| 2,455,038 | Breth | Nov. 30, 1948 |
| 2,464,020 | Breth | Mar. 8, 1949 |
| 2,488,340 | Shook et al. | Nov. 15, 1949 |
| 2,490,445 | Kuffler | Dec. 6, 1949 |